US008062998B2

(12) United States Patent
Fulton et al.

(10) Patent No.: US 8,062,998 B2
(45) Date of Patent: *Nov. 22, 2011

(54) METHOD OF TREATING A FORMATION USING DEFORMABLE PROPPANTS

(75) Inventors: Robert Gordon Fulton, Calgary (CA); Adolph Joseph John Peskunowicz, Redwood Meadows (CA); Garnet Ross Olson, Calgary (CA)

(73) Assignee: Canyon Technical Services, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,462

(22) Filed: Dec. 23, 2010

(65) Prior Publication Data

US 2011/0088900 A1   Apr. 21, 2011

Related U.S. Application Data

(63) Continuation of application No. 12/258,810, filed on Oct. 27, 2008, now Pat. No. 7,875,574, which is a continuation of application No. 11/360,140, filed on Feb. 22, 2006, now abandoned.

(30) Foreign Application Priority Data

Feb. 17, 2006   (CA) ................... 2536957

(51) Int. Cl.
C09K 8/62 (2006.01)
E21B 43/267 (2006.01)

(52) U.S. Cl. .............. 507/219; 166/280.1; 166/280.2; 507/200; 507/221; 507/231

(58) Field of Classification Search ............. 507/219, 507/200, 221, 231; 166/280.1, 280.2
See application file for complete search history.

(56) References Cited

U.S. PATENT DOCUMENTS

| | | | |
|---|---|---|---|
| 2,950,247 A | 8/1960 | McGuire et al. | |
| 3,089,542 A | 5/1963 | Kolodny | |
| 3,121,464 A | 2/1964 | Huitt et al. | |
| 3,266,573 A | 8/1966 | Rixe | |
| 3,481,401 A | 12/1969 | Graham | |
| 3,659,651 A | 5/1972 | Graham | |
| 3,677,941 A | 7/1972 | Mazzara et al. | |
| 3,998,272 A | 12/1976 | Maly | |
| 4,585,064 A | 4/1986 | Graham et al. | |
| 4,680,230 A | 7/1987 | Gibb et al. | |
| 4,875,525 A | 10/1989 | Mana | |
| 5,095,987 A | 3/1992 | Weaver et al. | |
| 5,225,123 A | 7/1993 | Torobin | |
| 5,368,102 A | 11/1994 | Dewprashad et al. | |
| 5,381,864 A | 1/1995 | Nguyen et al. | |
| 5,531,274 A | 7/1996 | Bienvenu, Jr. | |
| 5,699,860 A | 12/1997 | Grundmann | |
| 5,791,415 A | 8/1998 | Nguyen et al. | |
| 5,908,073 A | 6/1999 | Nguyen et al. | |
| 5,929,002 A | 7/1999 | Joyce et al. | |
| 6,059,034 A | 5/2000 | Rickards et al. | |
| 6,176,313 B1 | 1/2001 | Coenen et al. | |
| 6,260,621 B1 | 7/2001 | Furman et al. | |
| 6,330,916 B1 | 12/2001 | Rickards et al. | |
| 6,364,018 B1 | 4/2002 | Brannon et al. | |
| 6,372,678 B1 | 4/2002 | Youngman et al. | |
| 6,406,789 B1 | 6/2002 | McDaniel et al. | |
| 6,439,309 B1 | 8/2002 | Matherly et al. | |
| 6,742,590 B1 | 6/2004 | Nguyen | |
| 6,772,838 B2 | 8/2004 | Dawson et al. | |
| 6,779,604 B2 | 8/2004 | Biegler et al. | |
| 6,832,650 B2 | 12/2004 | Nguyen et al. | |
| 6,866,099 B2 | 3/2005 | Nguyen | |
| 6,983,797 B2 | 1/2006 | Nguyen et al. | |
| 7,021,378 B2 | 4/2006 | Prukop | |
| 7,044,220 B2 | 5/2006 | Nguyen et al. | |
| 7,066,258 B2 | 6/2006 | Justus et al. | |
| 7,128,158 B2 | 10/2006 | Nguyen et al. | |
| 7,178,596 B2 | 2/2007 | Blauch et al. | |
| 7,216,711 B2 | 5/2007 | Nguyen et al. | |
| 7,228,904 B2 | 6/2007 | Todd et al. | |
| 7,255,169 B2 | 8/2007 | Van Batenburg et al. | |
| 7,267,171 B2 | 9/2007 | Dusterhoft et al. | |
| 7,281,580 B2 | 10/2007 | Parker et al. | |
| 7,281,581 B2 | 10/2007 | Nguyen et al. | |
| 7,322,411 B2 | 1/2008 | Brannon et al. | |
| 7,325,608 B2 | 2/2008 | Van Batenburg et al. | |
| 7,334,635 B2 | 2/2008 | Nguyen | |
| 7,334,636 B2 | 2/2008 | Nguyen | |
| 7,875,574 B2 * | 1/2011 | Fulton et al. ........ | 507/219 |
| 2004/0040708 A1 | 3/2004 | Stephenson et al. | |
| 2007/0125536 A1 | 6/2007 | Acock et al. | |
| 2007/0181302 A1 | 8/2007 | Bicerano | |
| 2007/0193746 A1 | 8/2007 | Brannon et al. | |
| 2007/0209795 A1 | 9/2007 | Gupta | |
| 2008/0000638 A1 | 1/2008 | Burukhin et al. | |

FOREIGN PATENT DOCUMENTS

CA      1317872      5/1993

(Continued)

*Primary Examiner* — Timothy J. Kugel

(74) *Attorney, Agent, or Firm* — Boyle Fredrickson, S.C.

(57) ABSTRACT

A substance and method for treating a subterranean formation using hydraulic fracturing. A non-metallic, substantially deformable, proppant particle is "elastically flexible" or "plastically compressible" and adapted for use at concentrations which will substantially create a partial monolayer. The method for treating a formation with a non-metallic deformable proppant, includes the steps of injecting a carrier fluid into the formation, the carrier fluid carrying an amount of the deformable proppant, wherein the carrier fluid is injected at a pressure and a flow rate sufficient to create or open an existing fracture or fracture network in the formation, and placing at least a portion of the deformable proppant in the fracture, the deformable proppant forming substantially a partial monolayer in the fracture, and reducing the pressure and/or the flow rate sufficient to allow the fracture in the formation to at least partially close, wherein at least a portion of the deformable proppant remains in the fracture to prop open at least a portion of the fracture.

34 Claims, 3 Drawing Sheets

FOREIGN PATENT DOCUMENTS

| | | |
|---|---|---|
| CA | 1319603 | 6/1993 |
| CA | 2181208 | 1/1997 |
| CA | 2217891 | 11/1997 |
| CA | 2135719 | 1/1998 |
| CA | 2497276 | 3/2004 |
| CA | 2519647 | 6/2004 |
| CA | 2513736 | 8/2004 |
| CA | 2514208 | 8/2004 |
| CA | 2519144 | 9/2004 |
| CA | 2530336 | 1/2005 |
| CA | 2509130 | 12/2005 |
| CA | 2520217 | 3/2006 |
| CA | 2517497 | 4/2006 |
| CA | 2517494 | 5/2006 |
| CA | 2531444 | 6/2006 |
| CA | 2497948 | 7/2006 |
| CA | 2601127 | 8/2006 |
| CA | 2226928 | 11/2006 |
| CA | 2549226 | 12/2006 |
| CA | 2565816 | 12/2006 |
| CA | 2492935 | 1/2007 |
| CA | 2531920 | 6/2007 |
| CA | 2600251 | 3/2008 |

* cited by examiner

FIG. 2
FIG. 2A
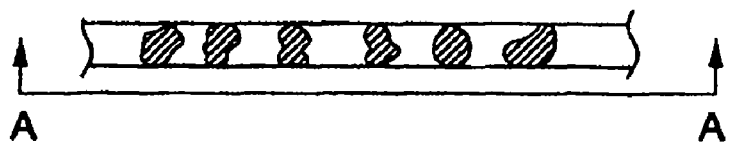
FIG. 2B
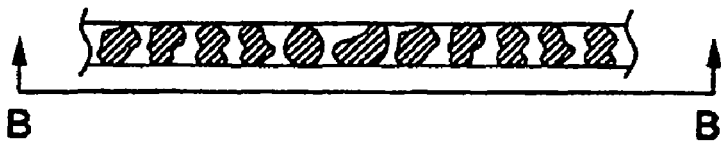
FIG. 2C
FIG. 2D
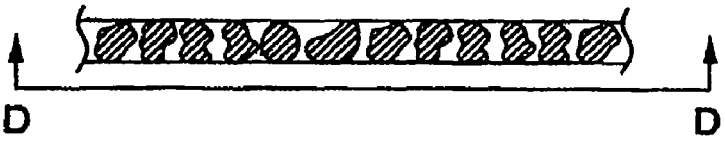
FIG. 2E
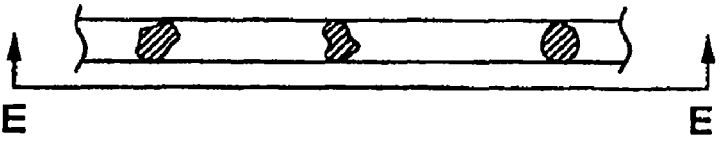
FIG. 3
FIG. 3A
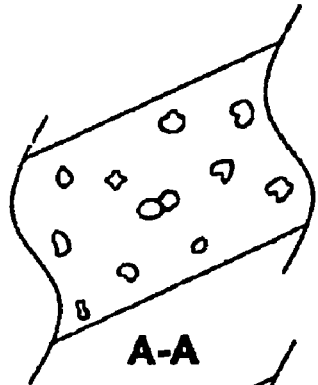
A-A
FIG. 3B
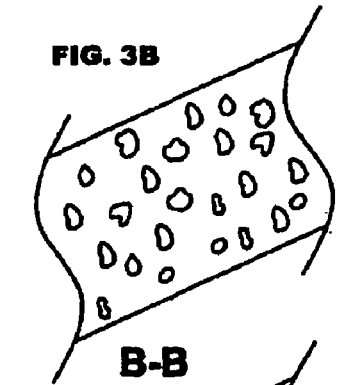
B-B
FIG. 3C
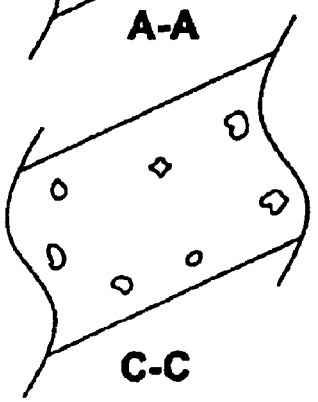
C-C
FIG. 3D
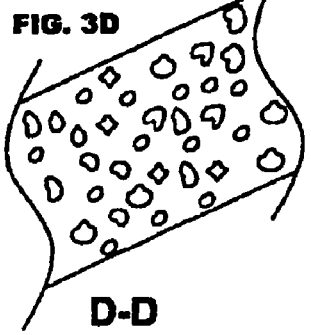
D-D
FIG. 3E
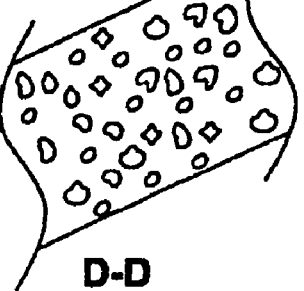
E-E

METHOD OF TREATING A FORMATION USING DEFORMABLE PROPPANTS

CROSS REFERENCE TO RELATED APPLICATIONS

This application is a continuation of U.S. application Ser. No. 12/258,810 filed on Oct. 27, 2008 now U.S. Pat. No. 7,875,574, which is a continuation of U.S. application Ser. No. 11/360,140 filed on Feb. 22, 2006, now abandoned, and claims the benefit of and priority to Canadian Application No. 2536957 filed on Feb. 17, 2006 and issued on Jan. 22, 2008, the entireties of which are herein incorporated by reference.

FIELD OF THE INVENTION

The present invention relates generally to proppants for fracturing operations for subterranean formations. More particularly, the present invention relates to deformable proppants.

BACKGROUND OF THE INVENTION

In oil and gas operations, stimulation or treatment of the subterranean formations using a fluid containing suspended particles, referred to as hydraulic fracturing, may be used to improve production. That is, a fluid, referred to in the art as a fracturing fluid, is pumped or injected through a well bore into a subterranean formation to be stimulated at a rate and pressure such that existing fractures are opened and/or new fractures are formed and extended into the subterranean formation. The fracturing fluid carries particles, referred to in the art as proppant particles, into the fractures. The particles are deposited in the fractures and the fracturing fluid dissipates into the subterranean formation and/or is returned to the surface. The particles function to "prop" open or prevent the fractures from closing whereby conductive channels remain through which produced fluids can flow to the well bore.

The paper "Propping Fractures with Aluminum Particles", Kern L. R. in (Petroleum Technology, June 1961 p. 583) teaches the use of malleable aluminum particles for producing high-conductivity fractures. Kern also teaches that flow capacity may be increased several fold with a sparse distribution of particles, but such flow capacity is limited by both crushing of the propping particles and by embedment of the propping particles in the walls of the formation. Kern teaches that as high loads are applied to the malleable aluminum particles, they deform slightly but do not shatter resulting in an increased bearing area against the formation wall, reducing stress on the malleable aluminum particle and reducing penetration of the malleable aluminum particle into the formation. Kern assesses the performance of nearly spherical aluminum particles which are deformed to produce nearly uniform disks (deformed thickness less than or equal to 0.5 times the original nearly spherical diameter). Kern suggests that malleable aluminum could be used in combination with sand to lower costs (compared to aluminum alone) and to provide a safety net in the event the aluminum does not perform as expected.

Disadvantages of propping with aluminum include limitations associated with the specific gravity of aluminum which restricts the fluids which may be used to place aluminum proppant particles, and the fluid may require special treatment such as viscosification or emulsification, etc., and in addition, as suggested by Kern, the high cost of aluminum is a factor. In addition, formations typically fractured today are very susceptible to damage produced by the fracturing fluid itself. This requires the use of less viscous fluids and physically less liquid (or foam) or gas (nitrogen, carbon dioxide etc.). Less viscous fluids and less volume of liquid or foam or gas means less carrying capacity for proppants, which may mean that proppants may not always enter the fracture or many not be distributed along the full length of the fracture.

U.S. Pat. No. 3,933,205 (Kiel) teaches a method for increasing well productivity by multiple hydraulic fracturing cycles using no proppant (self propping) or using sand as a proppant. The initial cycles are designed to form spalls of the formation material in the fracture and subsequent cycles displace the spalls into the fracture, thus propping the fracture open or creating extensions or branches and propping open the extensions or branches.

However, this method relies on causing formation damage to create the desired spalls and teaches only the use of no proppant or sand as a proppant.

U.S. Pat. No. 5,531,274 (Bienvenu) teaches a high strength, lightweight proppant for use in hydraulic fracturing, having a specific gravity approximately equal to the specific gravity of water. Bienvenu teaches that such a proppant, such as a styrene-divinyl-benzene copolymer bead, set in a formation as a packed mass of particles adjacent to a fracture, will prop open the fracture.

However, when closure stress exceeds the deformation limits of the proppant in the packed mass, the effective permeability of the packed mass (and the related conductivity of the formation) decreases as the proppant is deformed, thus reducing or eliminating the flow channels that normally exist between the particles forming the packed mass.

U.S. Pat. No. 6,059,034 (Rickards et al.) teaches a formation treatment method using deformable particles, the deformable particles formed of a blend of fracture proppant material and deformable particulate. As examples, the fracture proppant material may be a material such as sand, and the deformable particulate may be a material such as polystyrene, as divinylbenzene beads.

However, this blend requires that both materials be blended and sufficiently mixed, and may result in the usual problems with sand type fracturing, such as fines.

It is, therefore, desirable to provide a deformable proppant that avoids the problems of metallic proppants, that is not formed into a deformed packed mass, and can be used on its own without additional proppants to improve stimulation and increase productivity in the fracturing operations of subterranean formations.

SUMMARY OF THE INVENTION

It is an object of the present invention to obviate or mitigate at least one disadvantage of previous proppants.

In a first aspect, the present invention provides a non-metallic, substantially deformable, proppant particle that is "elastically flexible" or "plastically compressible" adapted for use alone as a propping agent in subsurface formation fracturing operations at concentrations which will substantially create a partial monolayer. The proppant may be an organic, inorganic, or combination polymer. The proppant may be manmade or naturally occurring. The proppant may be a single polymer or a mixture of polymers to form the particles. The proppant may include a single polymer or a combination of polymers that are layered or coated to create a particle. The proppant may include a solid outer shell or layers of polymer that encase an inner fluid.

Preferably, the proppant has a sphericity of 0.9 to 0.3, tested in accordance with API RP 56. Preferably, the proppant has a roundness of 0.1 to 0.90, tested in accordance with API RP 56.

Preferably, the proppant is shatter resistant under a closure stress. Preferably, the expected closure stress to be resisted is between about 10 MPa and about 80 MPa. More preferably, that closure stress is between about 20 MPa and about 50 MPa.

Preferably, the proppant is resistant to chemical reaction. Preferably, the proppant is adapted to be substantially non-soluble in a formation fluid, and vice versa. Preferably, the proppant is substantially non-permeable. Preferably, the proppant is a material selected from the group of high density polyethylene (HDPE), polyethylene terephthalate (PET), polypropylene (PP), or styrene-divinyl-benzene copolymer.

Preferably, the proppant includes particles having a specific gravity of between about 0.1 and about 2.5. More preferably, the particles have a specific gravity of between about 0.5 and about 2.2. Most preferably, the particles have a specific gravity of between about 0.9 and about 2.0.

Preferably, the proppant has a crush resistance of more than substantially 50 MPa. More preferably, the proppant has a crush resistance of more than substantially 80 MPa.

Preferably, the proppant has an undeformed maximum cross sectional measurement of about 5.0 mm. Preferably, the proppant is formed to have a pre-deformed initial shape, the initial shape comprising a disk, rice-shape, cubeoid, spheroid, or toroid (donut).

In further aspect, the present invention provides a method of treating a subterranean formation with a non-metallic deformable proppant, including the steps of injecting a carrier fluid into the formation, the carrier fluid carrying an amount of the deformable proppant, wherein the carrier fluid is injected at a pressure and a flow rate sufficient to open a fracture (creating a new fracture or opening an existing fracture) in the formation, placing at least a portion of the deformable proppant in the fracture, the deformable proppant forming substantially a partial monolayer in the fracture, and reducing the pressure and/or the flow rate sufficient to allow the fracture in the formation to at least partially close, wherein at least a portion of the deformable proppant remains in the fracture to prop open at least a portion of the fracture.

Preferably, the amount is selected such that the proppant is placed in the fracture in a monolayer about 1.0 layer thick. Preferably, the amount is between about 10 and 40 kg/m$^3$ of carrier fluid. More preferably, the amount is between about 25 and 100 kg/m$^3$ of carrier fluid. Most preferably, the amount is less than about 200 kg/m$^3$ of carrier fluid.

Preferably, the portion of the proppant that remains in the fracture to prop open at least a portion of the fracture is distributed at a proppant concentration, the proppant concentration in kg/m$^2$ being less than $1.088(r)(SG)$, wherein r is the equivalent radius of the proppant in millimeters and SG is the specific gravity of the proppant.

Preferably, the fracture is a single or multiple fracture with both generally vertical components and generally horizontal components. The fracture may include a portion that is a generally horizontal fracture.

Preferably, the carrier fluid is a gas (for example $CO_2$, $N_2$), a liquid (for example Water, HC), a foam (for example liquid, gas, and surfactant) or a combination thereof (for example $N_2+CO_2+Water$).

Preferably, the proppant is elastically deformed under a closure stress. Preferably, the proppant is plastically deformed under a closure stress. Preferably, the proppant is elastically and plastically deformed under a closure stress. Preferably, the closure stress is between about 20 MPa and about 80 MPa.

Preferably, the proppant has an elastic deformation resistance and a plastic deformation resistance, and the closure stress is greater than the elastic deformation resistance and the closure stress is less than the plastic deformation resistance.

Preferably, the proppant is deformed when a closure stress is applied.

In a further aspect, the present invention provides a method of treating a formation with a non-metallic deformable proppant, comprising the steps of applying a treatment cycle comprising the steps of i) injecting a carrier fluid into the formation, the carrier fluid carrying an amount of the deformable proppant, wherein the carrier fluid is injected at a pressure and a flow rate sufficient to open a fracture in the formation, ii) placing at least a portion of the deformable proppant in the fracture, the deformable proppant forming substantially a partial monolayer in the fracture, and iii) reducing the pressure and/or the flow rate sufficient to allow the fracture in the formation to at least partially close, wherein at least a portion of the deformable proppant remains in the fracture to prop open at least a portion of the fracture, and then repeating the treatment cycle at least one time.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2a-e are representative simplified drawings of a portion of a fracture propped with a partial monolayer placement of proppant using the substance and method of the present invention;

FIG. 3 is representative simplified drawings the fractures of FIGS. 2a-e taken along the lines a-a through e-e.

DETAILED DESCRIPTION

Generally, the present invention provides a method and substance for propping a fracture in a subterranean formation, such as in hydraulic fracturing operations in the oil and gas production industry used to fracture underground reservoirs bearing oil and gas, to provide or enhance flow channels to improve the fluid conductivity of the formation to provide increased oil and gas production rates.

Figure 1:
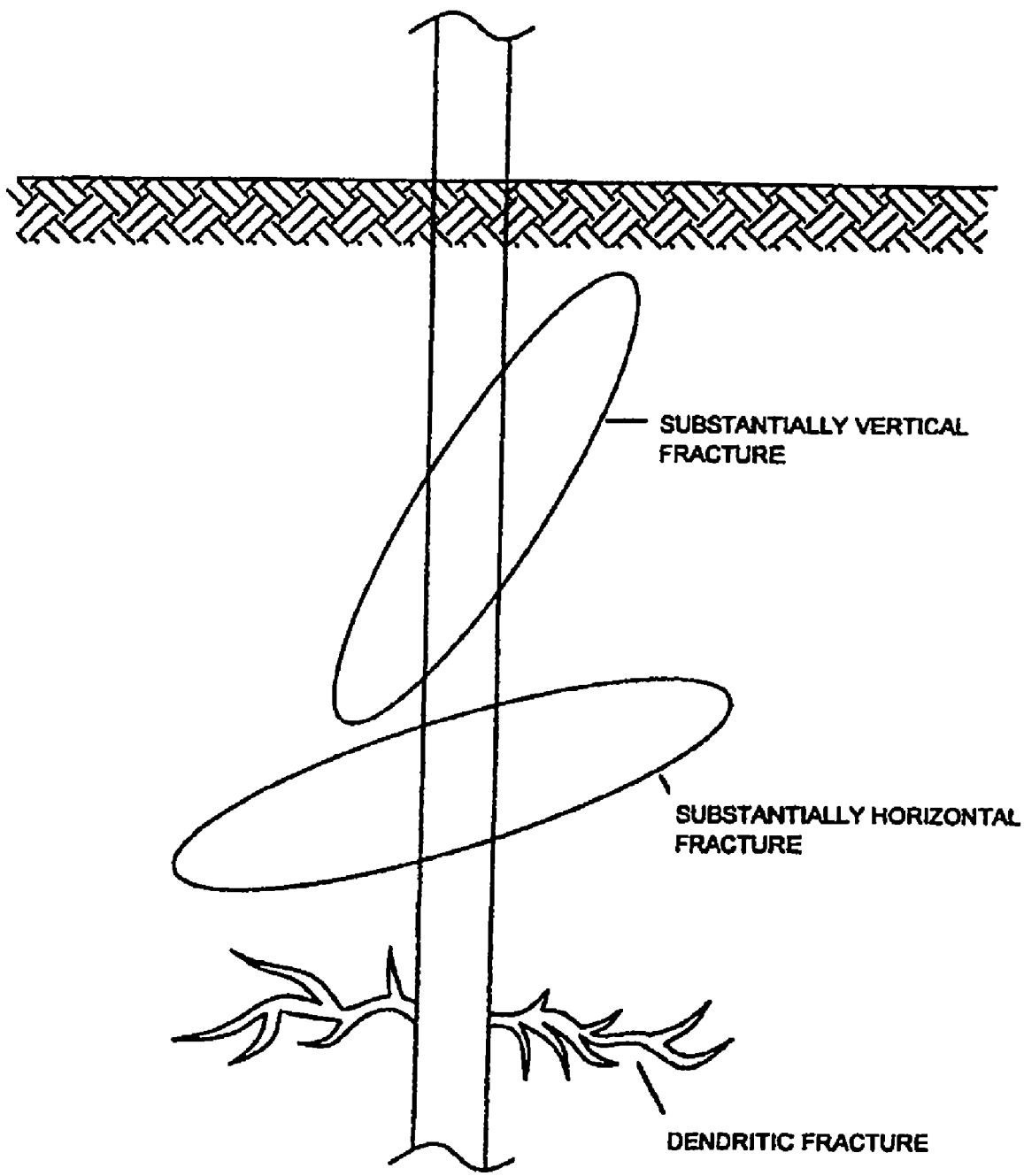
FIG. 1 is a simplified cross-sectional view of a subterranean formation showing hydraulic fracture treatment of the formation and typical examples of resulting fractures using the method and substance of the present invention.

Referring generally to FIG. 1, the method and substance of the present invention are applicable to a wide variety of fractures, including (but not limited to) substantially vertical, substantially horizontal, and dendritic (or branched) fractures. The method and substance of the present invention may be used for hydraulic fracturing operations using equipment commonly used for conventional (sand) fracturing operations, known to one skilled in the art.

Referring generally to FIGS. 2 and 3, the method and substance of the present invention includes a monolayer of varying concentrations.

Figure 4:
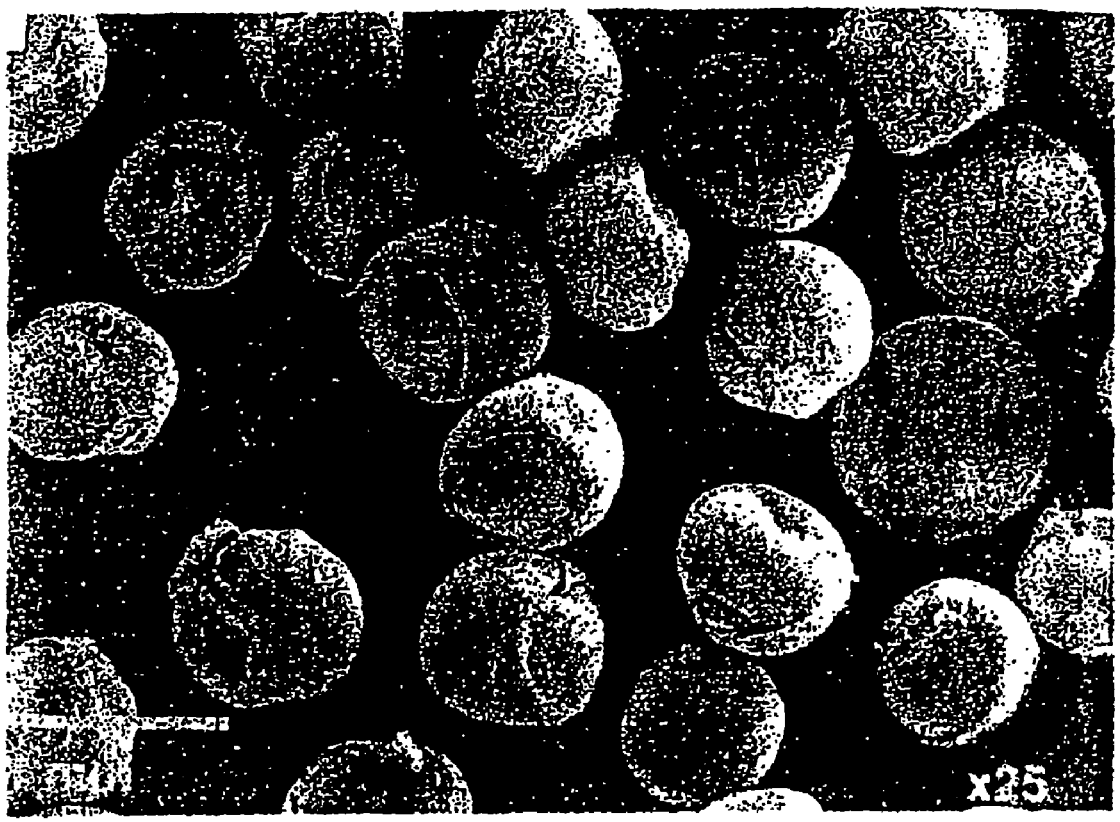
FIG. 4 is a magnified view of a proppant of the present invention.

Referring generally to FIG. 4, one example of a proppant of the present invention is shown, in a pre-deformed state.

The deformable proppant of the present invention may be of a unitary material or may include a core surrounded by a shell. The core may be a fluid (liquid), such as water, hydrocarbon, or other fluid known in the industry. This composite (liquid with shell) design provides a less compressible base and increases the elastic limit while allowing the shell to deform, reducing embedment into the formation. The core may be a gas. This composite (gas with shell) design provides reduced specific gravity.

The proppant and method of the present invention can be used with equipment typically used for fracturing operations known to one skilled in the art, using conventional carrier fluids.

The art has been developing with very high concentrations of proppants and very viscous carriers to substantially create a multilayer proppant pack. The state of the art requires a large amount of proppant to maximize the propping open of the cracks formed in the formation, such as 1,000 kg/m$^3$ of proppant (or more).

Placing that much proppant that is a deformable proppant leads to a "pack" that is deformed into a low conductivity mass by closure stresses in the formation. This leads to the practical necessity that the proppant be spherical and very rigid to allow the spaces in-between individual proppant particle when closely packed act as flow channels (i.e. remaining open even under the closure stress of the formation). However, the rigid particles may then become embedded into the formation when closure stress is applied, leading to lower conductivity or formation damage.

In the present invention, a partial monolayer is formed to prop open fractures. The partial monolayer arrangement allows improved conductivity and the deformable proppant reduces embedment of proppant particles into the formation. In order to obtain the partial monolayer placement of the proppant, the proppant is introduced into the carrier fluid at a relatively low concentration to substantially create a partial proppant monolayer rather than a closely packed multilayer.

The deformable proppant may be any shape, including but not limited to: spherical, disk shaped, rice-shaped, or cubical.

"Proppant concentration" refers to the amount of proppant per unit area of fracture wall (measured on one side only). In US customary units, it is expressed in pounds of proppant per square foot of one wall of fracture. In SI units it is expressed in kilograms per square meter of one wall of fracture face. In SI units, the Deformable Proppant Concentration in kg/m2<1.088(r) (SG) where r is the equivalent radius of the proppant in millimeters and SG is the specific gravity of the proppant. In US customary units, the Deformable Proppant Concentration in lbm/ft2<5.647(r) (SG) where r is the radius of the proppant in millimeters and SG is the specific gravity of the proppant.

Two example applications are outlined below:

Case #1

A sandstone formation in Alberta, Canada was treated with conventional fracturing techniques with initial flow rates being too small to measure (TSTM). A similar treatment on the same formation utilizing 2270 kg of light weight polystyrene divinyl benzene deformable proppant (CBM-LWP) with a specific gravity of 1.05 was placed in stages. Each stage was engineered to place proppant within the fracture at a concentration of 0.0825 kg/m$^2$. Proppant was pumped at a concentration between 25 and 150 kg/m$^3$ of carrier fluid. After initial flow back, the well produced measurable gas and the subsequent pressure build up and analysis showed a stimulated well.

Case #2

A dry coal (Horse Shoe Canyon Formation) in Alberta, Canada is normally treated with high rate nitrogen fracturing. A well from the field was fractured using 330 kg of light weight polystyrene divinyl benzene deformable proppant (CBM-LWP) in each of two coal seams. Each stage was engineered to place proppant within the fracture at a concentration of 0.0825 kg/m$^2$. Proppant was pumped at a concentration of approximately 13 kg/m$^3$ of carrier fluid. After initial 300 hour flowback, gas rates were higher than surrounding wells.

As used herein, "crush" means catastrophic failure of the proppant and "deformation" means any change in shape of the proppant.

The above-described embodiments of the present invention are intended to be examples only. Alterations, modifications and variations may be effected to the particular embodiments by those of skill in the art without departing from the scope of the invention, which is defined solely by the claims appended hereto.

We claim:

1. A non-metallic, deformable, proppant particle that is elastically flexible or plastically compressible and adapted for use as a propping agent in subsurface formation fracturing operations at concentrations which will create a partial monolayer, the proppant concentration in kg/m$^2$ being less than 1.088•r•SG, wherein r is the equivalent radius of the proppant in millimeters and SG is the specific gravity of the proppant.

2. The deformable proppant of claim 1, being crush resistant under a closure stress.

3. The deformable proppant of claim 2, wherein the closure stress is between about 10 MPa and about 80 MPa.

4. The deformable proppant of claim 3, wherein the closure stress is between about 20 MPa and about 50 MPa.

5. The deformable proppant of claim 1, wherein the particle has a specific gravity of between about 0.1 and about 2.5.

6. The deformable proppant of claim 5, wherein the particle has a specific gravity of between about 0.5 and about 2.2.

7. The deformable proppant of claim 6, wherein the particle has a specific gravity of between about 0.9 and about 2.0.

8. The deformable proppant of claim 1, comprising an organic, inorganic, or combination polymer.

9. The deformable proppant of claim 8, where the polymer is manmade or naturally occurring.

10. The deformable proppant of claim 1, wherein the proppant has a crush resistance of more than about 50 MPa.

11. The deformable proppant of claim 10, wherein the proppant has a crush resistance of more than about 80 MPa.

12. The deformable proppant of claim 1, comprising a single polymer or a mixture of polymers to create the particle.

13. The deformable proppant of claim 1, having a sphericity of 0.9 to 0.3, tested in accordance with API RP 56.

14. The deformable proppant of claim 1, having a roundness of 0.1 to 0.90, tested in accordance with API RP 56.

15. The deformable proppant of claim 1, wherein the deformable proppant is chemically inert.

16. The deformable proppant of claim 1, wherein the deformable proppant is non-soluble in a formation fluid.

17. The deformable proppant of claim 1, wherein the proppant comprises a material selected from the group of high density polyethylene (HDPE), polyethylene terephthalate (PET), polypropylene (PP), or styrene-divinyl-benzene copolymer.

18. The deformable proppant of claim 1, wherein the proppant is non-permeable.

19. The deformable proppant of claim 1, wherein the proppant is non-absorbent of fracturing fluid.

20. The deformable proppant of claim 1, wherein the proppant has a predeformed maximum cross sectional measurement of about 5.0 mm.

21. The deformable proppant of claim 1, wherein the proppant is formed to have a pre-deformed initial shape, the initial shape comprising a disk, rice-shape, cubeoid, spheroid, or toroid.

22. A method of treating a subterranean formation with a non-metallic deformable proppant, comprising the steps of:
   a. injecting a carrier fluid into the formation, the carrier fluid carrying an amount of the deformable proppant, wherein the carrier fluid is injected at a pressure and a flow rate sufficient to open a fracture by at least one of creating a new fracture and opening an existing fracture in the formation;
   b. placing at least a portion of the deformable proppant in the fracture, the deformable proppant forming a partial monolayer in the fracture; and
   c. reducing the pressure and/or the flow rate sufficient to allow the fracture in the formation to at least partially close,
   wherein at least a portion of the deformable proppant remains in the fracture to prop open at least a portion of the fracture, the portion of the deformable proppant that remains in the fracture to prop open at least a portion of the fracture is distributed at a proppant concentration, the proppant concentration in kg/m$^2$ being less than $1.088 \cdot r \cdot SG$, wherein r is the equivalent radius of the proppant in millimeters and SG is the specific gravity of the proppant.

23. The method of claim 22, wherein the proppant is elastically, plastically, or elastically and plastically deformed under a closure stress.

24. The method of claim 23 wherein the closure stress is between about 20 MPa and about 80 MPa.

25. The method of claim 22, wherein the amount is selected such that the proppant is placed in the fracture in a monolayer or 1.0 layer thick.

26. The method of claim 22, wherein the amount is between about 10 and 40 kg/m3 of carrier fluid.

27. The method of claim 22, wherein the amount is between about 25 and 100 kg/m3 of carrier fluid.

28. The method of claim 22, wherein the amount is less than about 200 kg/m3 of carrier fluid.

29. The method of claim 22, wherein the fracture extends through the formation in a direction that defines a horizontal component.

30. The method of claim 22, wherein the fracture extends through the formation in at least one direction, the at least one direction including both a vertical component and a horizontal component.

31. The method of claim 22, wherein the carrier fluid is a gas, a liquid, a foam or a combination thereof.

32. The method of claim 22, wherein the proppant has an elastic deformation resistance and a plastic deformation resistance, and the closure stress is greater than the elastic deformation resistance and the closure stress is less than the plastic deformation resistance.

33. The method of claim 22, wherein the proppant is deformed when a closure stress is applied.

34. A method of treating a formation with a non-metallic deformable proppant, comprising the steps of:
   a. applying a treatment cycle comprising the steps of:
      i. injecting a carrier fluid into the formation, the carrier fluid carrying an amount of the deformable proppant, wherein the carrier fluid is injected at a pressure and a flow rate sufficient to open a fracture in the formation;
      ii. placing at least a portion of the deformable proppant in the fracture, the deformable proppant forming a partial monolayer in the fracture; and
      iii. reducing the pressure and/or the flow rate sufficient to allow the fracture in the formation to at least partially close, wherein at least a portion of the deformable proppant remains in the fracture to prop open at least a portion of the fracture, the portion of the deformable proppant that remains in the fracture to prop open at least a portion of the fracture is distributed at a proppant concentration, the proppant concentration in kg/m$^2$ being less than $1.088 \cdot r \cdot SG$, wherein r is the equivalent radius of the proppant in millimeters and SG is the specific gravity of the proppant; and
   b. repeating the treatment cycle at least one time.

* * * * *